United States Patent
Puckett et al.

(10) Patent No.: US 12,111,496 B2
(45) Date of Patent: Oct. 8, 2024

(54) APPARATUSES AND METHODS FOR AN OPTICAL COUPLER

(71) Applicant: Honeywell International Inc., Charlotte, NC (US)

(72) Inventors: Matthew Wade Puckett, Phoenix, AZ (US); Chad Hoyt, Roseville, MN (US); Karl D. Nelson, Plymouth, MN (US); Jianfeng Wu, Tucson, AZ (US)

(73) Assignee: Honeywell International Inc., Charlotte, NC (US)

( * ) Notice: Subject to any disclaimer, the term of this patent is extended or adjusted under 35 U.S.C. 154(b) by 197 days.

(21) Appl. No.: 17/843,485

(22) Filed: Jun. 17, 2022

(65) Prior Publication Data

US 2023/0408765 A1 Dec. 21, 2023

(51) Int. Cl.
*G02B 6/125* (2006.01)
*G02B 6/12* (2006.01)
*G02B 6/122* (2006.01)
*G02B 6/124* (2006.01)
*G02B 6/28* (2006.01)

(52) U.S. Cl.
CPC ............ *G02B 6/125* (2013.01); *G02B 6/1228* (2013.01); *G02B 6/124* (2013.01); *G02B 6/2821* (2013.01); *G02B 2006/12107* (2013.01); *G02B 2006/12147* (2013.01)

(58) Field of Classification Search
CPC ........ G02B 6/1228; G02B 6/125; G02B 6/14; G02B 6/305
See application file for complete search history.

(56) References Cited

U.S. PATENT DOCUMENTS

| | | | |
|---|---|---|---|
| 7,027,702 B2 | 4/2006 | Hanashima et al. | |
| 9,874,692 B2* | 1/2018 | Oka | G02F 1/011 |
| 11,360,268 B1* | 6/2022 | Ling | G02B 6/2938 |
| 2003/0108274 A1* | 6/2003 | Haronian | G02B 6/122 |
| | | | 385/24 |
| 2005/0013574 A1* | 1/2005 | Hanashima | G02B 6/105 |
| | | | 385/129 |
| 2012/0230630 A1 | 9/2012 | Dougherty et al. | |
| 2014/0270620 A1* | 9/2014 | Anderson | G02B 6/2773 |
| | | | 385/11 |
| 2017/0176680 A1* | 6/2017 | Oka | G02F 1/011 |

OTHER PUBLICATIONS

Rana, Farhan, "Chapter 8: Integrated Optical Waveguides," from Cornell University. (Year: ND).*
Hosseini et al., "Mode Order Converter Using Tapered Multi-mode Interference Couplers", Feb. 21, 2010, (c) 2010 Optical Society of America, pp. 1 through 3.

(Continued)

*Primary Examiner* — Michelle R Connelly
*Assistant Examiner* — Emma R. Oxford
(74) *Attorney, Agent, or Firm* — Fogg & Powers LLC

(57) ABSTRACT

Techniques are provided for implementing a low insertion loss optical coupler utilizing a low confinement planar optical waveguide and two high confinement planar optical waveguides. The optical coupler efficiently couples an optical signal with a cross section greater than either high confinement planar optical waveguide.

14 Claims, 4 Drawing Sheets

(56) References Cited

OTHER PUBLICATIONS

Taher et al., "Adiabatically tapered microstructured mode converter for selective excitation of the fundamental mode in a few mode fiber", Optics Express, Jan. 15, 2016, vol. 24, Issue 2, pp. 1376 through 1385, as downloaded from: https://doi.org/10.1364/OE.24.001376.

Zhang et al., "On-chip optical mode exchange using tapered directional coupler", Scientific Reports, Nov. 4, 2015, Article No. 16072, pp. 1 through 7, as downloaded from https://www.nature.com/articles/srep16072.

* cited by examiner

APPARATUSES AND METHODS FOR AN OPTICAL COUPLER

STATEMENT REGARDING FEDERALLY SPONSORED RESEARCH OR DEVELOPMENT

This invention was made with Government support under Contract No. HR0011-22-C-0018 awarded by DARPA. The Government has certain rights in the invention.

BACKGROUND

An optical edge coupler is formed on an edge of a photonic integrated circuit (IC) and is used to couple an external optical signal (including only a fundamental transverse electric or magnetic mode) into a photonic IC. Conventional optical edge couplers are implemented with a high confinement optical waveguide configured to receive the external optical signal. The high confinement optical waveguide is used because it has better non-linear properties when used to implement a non-linear optical component and/or because it permits a lower critical bend radius useful for both linear and non-linear optical applications.

However, the conventional optical edge coupler using the high confinement optical waveguide configured to receive the external optical signal has a relatively high, and thus undesirable, insertion loss because it does not capture all of optical energy of the external optical signal incident upon the optical edge coupler because the external optical signal has a larger cross section than the cross section of the high confinement optical waveguide.

SUMMARY

An optical coupler is provided. The optical coupler comprises: a low confinement (LC) optical waveguide comprising a first LC end, a second LC end opposite the first LC end, and a first portion (FP) of LC optical waveguide comprising a first FP end, a second FP end opposite the first FP end, and a first port that at least one of is at and extends from the first LC end, wherein low confinement optical waveguide means an optical waveguide having a first standardized refractive index less than 0.25, wherein the first port is configured to receive or emit a first optical signal consisting of a fundamental transverse electrical mode or a fundamental transverse magnetic mode, and wherein the first standardized refractive index=(Neff−Ncladding)/
(Ncore1−Ncladding), wherein Neff means an effective index of a fundamental mode of an optical signal in a waveguide, Ncladding means an index of refraction of cladding material of the waveguide, and Ncore1 means an index of refraction of core material of the low confinement optical waveguide; a first high confinement (HC) optical waveguide comprising a first HC end, a second HC end opposite the first HC end, and a second portion (SP) and a third portion of first HC optical waveguide, wherein the second portion comprises a first SP end, and a second SP end opposite the first SP end, wherein the third portion comprises a first TP end and a second TP end, wherein a high confinement optical waveguide means an optical waveguide having a second standardized refractive index greater than 0.75, wherein a first distance between the first HC end and a point, closest to the first HC end, on the low confinement optical waveguide is greater than one wavelength of the first optical signal; wherein a first tapered distance between the low confinement optical waveguide and a closest point on the first high confinement optical waveguide is adiabatically tapered smaller away from the first HC end so that a second distance between the first portion and a closest point on the second portion is less than the one wavelength of the first optical signal, wherein the first portion is substantially parallel to the second portion so that an optical signal insertion loss between the first and the second portions is less than 0.1 decibels, wherein a first width of the first high confinement optical waveguide is adiabatically tapered narrower from the first HC end through the first SP end, wherein a width of the first SP end is less than Lambda/Ncore, where Lambda is a wavelength of the first optical signal, wherein a width of the second SP end is greater than Lambda/Ncore, wherein the second standardized refractive index=(Neff−Ncladding)/
(Ncore2−Ncladding), wherein Ncore2 means an index of refraction of core material of a high confinement optical waveguide, and wherein a second tapered distance between the low confinement optical waveguide and a closest point on the first high confinement optical waveguide is adiabatically tapered larger toward the second LC end so that a third distance between the second LC end and a closest point on the first high confinement optical waveguide is greater than the one wavelength of the first optical signal; a second high confinement optical waveguide comprising a third HC end, a fourth HC end opposite the third HC end, and a fourth portion (FthP) of second HC optical waveguide comprising a first FthP end, and a second FthP end opposite the first FthP end, wherein the fourth portion is substantially parallel to the third portion so that an optical signal insertion loss between the third and the fourth portions is less than 0.1 decibels, wherein a second width of the second high confinement optical waveguide is adiabatically tapered wider from the first FthP end through the second FthP end, wherein a width of the first FthP end is less than Lambda/K*Ncore, wherein a width of the second FthP end is greater than Lambda/K*Ncore, and wherein K is a constant greater than one, wherein a fourth distance between the third HC end and a closest point on the first high confinement optical waveguide is greater than one wavelength of the first optical signal; wherein a third tapered distance between the second high confinement optical waveguide and a closest point on the first high confinement optical waveguide is adiabatically tapered smaller away from the third HC end so that a fifth distance between the third portion and the fourth portion is less than the one wavelength of the first optical signal, and wherein a fourth tapered distance between the first high confinement optical waveguide and the second high confinement optical waveguide is adiabatically tapered larger toward the second HC end so that a sixth distance between the second HC end and a closest point on the second high confinement optical waveguide is greater than the one wavelength of the first optical signal; a substrate, wherein the LC optical waveguide, the first HC optical waveguide, and the second HC optical waveguide are over the substrate; and wherein the fourth HC end is configured to respectively emit or receive the first optical signal consisting of respectively the fundamental transverse electrical mode or the fundamental transverse magnetic mode; wherein the LC optical waveguide, the first HC optical waveguide, and the second HC optical waveguide are planar optical waveguide.

An optical coupler is provided. The optical coupler comprises: a first planar optical waveguide comprising a first portion of optical waveguide and a first end, and wherein the first end is configured to receive or emit a first optical signal consisting of a fundamental transverse electrical mode or a fundamental transverse magnetic mode; a second planar optical waveguide comprising a second portion of optical waveguide, wherein the second portion and the first portion are configured to exchange a higher order mode optical signal consisting of respectively transverse electric or transverse magnetic, and wherein higher order means an order greater than one; a third planar optical waveguide comprising a third portion of optical waveguide and a second end, wherein the third portion and the second portion are configured to exchange an optical signal consisting of respectively the fundamental transverse electrical mode or the fundamental transverse magnetic mode, and wherein the second end is configured to respectively emit or receive the first optical signal consisting of respectively the fundamental transverse electrical mode or the fundamental transverse magnetic mode; and a substrate, wherein the first, the second, and the third planar optical waveguides are over the substrate; wherein an insertion loss of the optical coupler is less than 0.2 decibels.

A method of optically coupling an optical energy consisting of a fundamental transverse electric mode or a fundamental transverse magnetic mode into and out of a high confinement optical waveguide is provided. The method comprises: receiving a first optical signal consisting of the fundamental transverse electric mode or the fundamental transverse magnetic mode at a first port of a first planar optical waveguide; optically coupling a first optical signal consisting of respectively a higher order transverse electric mode or a higher order transverse magnetic mode from the first planar optical waveguide into a second optical waveguide; and optically coupling the first optical signal consisting of respectively the fundamental transverse electric mode or the fundamental transverse magnetic mode from a second planar optical waveguide into a third planar optical waveguide; wherein the second planar optical waveguide comprises a first high confinement planar waveguide; wherein the first planar optical waveguide comprises a low confinement planar waveguide or a second high confinement planar waveguide; wherein the third planar optical waveguide comprise respectively the second high confinement planar waveguide or the low confinement planar waveguide; wherein low confinement planar waveguide means an optical waveguide having a first standardized refractive index less than 0.25, and wherein the first standardized refractive index=(Neff−Ncladding)/(Ncore1−Ncladding), wherein Neff means an effective index of a fundamental mode of an optical signal in a waveguide, Ncladding means an index of refraction of cladding material of the waveguide, and Ncore1 means an index of refraction of core material of the low confinement planar waveguide; wherein a high confinement planar waveguide means an optical waveguide having a second standardized refractive index greater than 0.75, wherein the second standardized refractive index=(Neff−Ncladding)/(Ncore2−Ncladding), wherein Ncore2 means an index of refraction of core material of a high confinement optical waveguide.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1:
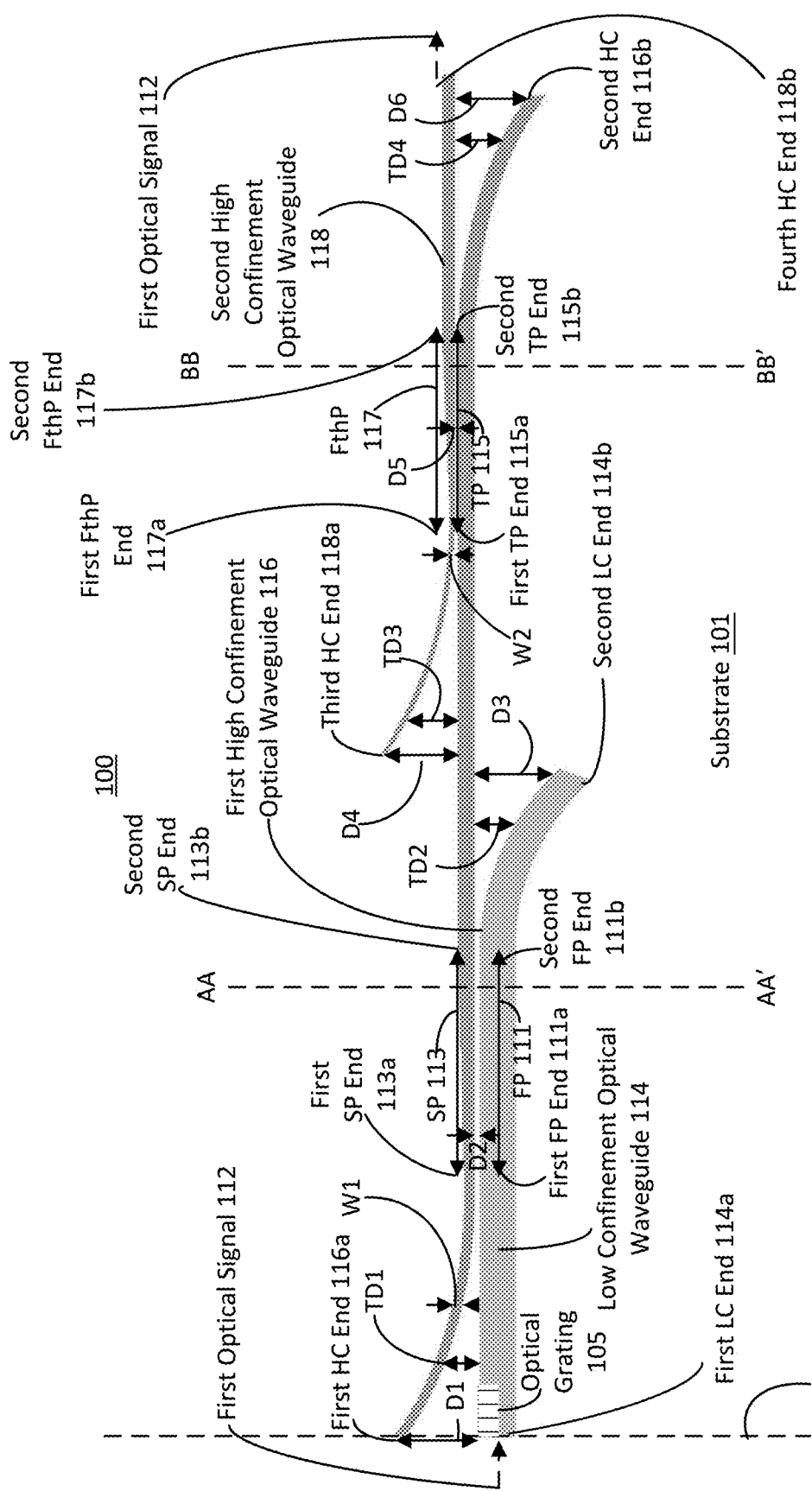
FIG. 1 illustrates a plan view of one embodiment of an optical coupler comprising a low confinement optical waveguide and two high confinement optical waveguides.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

An optical coupler utilizing optical coupling between a low confinement (LC) optical waveguide a first high confinement (HC) optical wave guide, and optical coupling between the first high confinement optical waveguide and a second high confinement optical waveguide may be used to diminish insertion loss of the optical coupler. Optionally, the insertion loss of the optical coupler is less than 0.2 dB.

The optical waveguide is planar optical waveguide. Planar optical waveguide means an optical waveguide formed by a core layer surrounded by at least two cladding layers, and which are formed over a substrate. Examples of planar optical waveguide are described elsewhere herein.

The optical coupler may or may not be an optical edge coupler. Optionally, when the optical coupler is not an optical edge coupler, the optical coupler uses an optical grating. An optical edge coupler, as used herein, means an optical coupler configured to receive an optical signal at an end of a planar optical waveguide of the optical edge coupler aligned with an edge of substrate on which the optical edge coupler is formed.

A first port at a first end of the low confinement optical waveguide is configured to receive or to emit a first optical signal including only a fundamental transverse electric or magnetic mode. The port may be the first end of the low confinement optical waveguide at an edge of a substrate on which the optical coupler is formed or an optical grating extending from the first end towards the second end. Optionally, the first end of the low confinement optical waveguide is a surface configured to be substantially orthogonal to an axis of travel of the first optical signal so as to diminish insertion loss of the optical coupler. The optical grating is formed on or over a surface of a cladding layer of the low confinement optical waveguide. An optical grating means a diffraction grating configured to transform an axis of travel of an incident optical signal, e.g., in free space, to a longitudinal axis of the low confinement optical waveguide in which an optical signal propagates, and to transform an axis of travel of an optical signal propagating along the longitudinal axis of and in the low confinement optical waveguide to another axis of travel, e.g., in free space. Optionally, the optical grating is configured to be substantially orthogonal to the axis of travel of the first optical signal so as to diminish insertion loss of the optical coupler.

A second port, i.e., one end of the second high confinement optical waveguide, is configured respectively to emit or to receive the first optical signal including only the fundamental mode. Although different types of optical waveguide may be used to implement embodiments of the invention, the embodiments disclosed herein are illustrated with planar optical waveguides. The first port and the second port may be also referred to respectively as the first optical port and the second optical port.

FIG. 1 illustrates a plan view of one embodiment of an optical coupler 100 comprising a low confinement optical waveguide, two high confinement optical waveguides, and a substrate. The optical coupler 100 includes a LC optical waveguide 114, a first HC optical waveguide 116, and a second HC optical waveguide 118. Each optical waveguide is implemented with a planar optical waveguide and is formed on the substrate 101. The LC optical waveguide 114 includes a first port, a second LC end 114$b$ opposite the first LC end 114$a$, and a first portion (FP) 111 of the LC optical waveguide 114. The first port includes at least one of a first LC end 114$a$ or an optical grating 105. The first LC end 114$a$ of the LC optical waveguide 114 is a surface configured to be substantially orthogonal to an axis of travel of the first optical signal 112 so as to diminish insertion loss of the optical coupler. The optical grating 105 is formed on or over a surface of a cladding layer of the low confinement optical waveguide; thus, optionally, the optical grating 105 is, e.g., formed on a surface of the LC optical waveguide 114, perpendicular to a surface of the LC optical waveguide 114 that is the first LC end 114$a$. Optionally, the optical grating 105 is substantially orthogonal to the axis of travel of the first optical signal so as to diminish insertion loss of the optical coupler. The FP 111 includes a first FP end 111$a$, and a second FP end 111$b$ opposite the first FP end 111$a$.

Optionally, the first LC end 114$a$ is located at an edge 103 of the substrate 101, e.g., of a photonic IC. The first LC end 114$a$ and/or the optical grating 105 are configured to receive or emit a first optical signal 112 including only a fundamental transverse electrical mode or a fundamental transverse magnetic mode. The first optical signal 112 may be received from or emitted (from the first LC end 114$a$ and/or the optical grating 105) to an optical fiber (e.g., including an end in physical contact with or optically coupled, for example through free space), free space, or another planar optical waveguide of another photonic IC (e.g., where the planar optical waveguide includes an end in physical contact with or optically coupled, for example through free space). For pedagogical reasons, FIG. 1 illustrates the first LC end 114$a$ configured to receive the first optical signal 112.

Low confinement optical waveguide means an optical waveguide having a first standardized refractive index less than 0.25. The first standardized refractive index=(Neff−Ncladding)/
(Ncore1−Ncladding), wherein Neff means an effective index of a fundamental mode of an optical signal in a waveguide, Ncladding means an index of refraction of cladding material of the waveguide, and Ncore1 means an index of refraction of core material of the low confinement optical waveguide.

The first HC optical waveguide 116 includes a first HC end 116$a$, a second HC end 116$b$ opposite the first HC end 116$a$, and a second portion (SP) 113 and a third (TP) 115 of the first HC optical waveguide 116. The second portion 113 includes a first SP end 113$a$ and a second SP end 113$b$ opposite the first SP end 113$a$. The third portion 115 includes a first TP end 115$a$ and a second third portion end 115$b$ opposite the first TP end 115$a$. A first distance D1 between (e.g., a sidewall of) the first HC end 116$a$ and a point, closest to the first HC end 116$a$, on (e.g., a sidewall of) the LC optical waveguide 114 (e.g., at the first LC end 114$a$) is greater than one wavelength of the first optical signal 112. Sidewall as mentioned herein with respect to separation distance may be a side wall of a cladding or a core; typically distance would be measured between sidewalls of cladding or sidewalls of cores. A first tapered distance TD1 between (e.g., a sidewall of) the LC optical waveguide and a closest point on (e.g., a side wall of) the first HC optical waveguide is adiabatically tapered, smaller away from the first HC end so that a second distance D2 between (e.g., a sidewall of) the first portion 111 and a closest point on (e.g., a sidewall of) the second portion 113 is less than the one wavelength of the first optical signal 112.

The first portion 111 is substantially parallel to the second portion 113 so that an optical signal insertion loss between the first portion 111 and the second portion 113 is less than 0.1 decibels. A first width W1 of the first high confinement optical waveguide is adiabatically tapered narrower from the first HC end 116$a$ through the first SP end 113$a$.

The adiabatic tapers described herein may be linear or non-linear. An adiabatic taper means a taper which allows either a change in (a) a cross-section of a waveguide while retaining all optical power of an optical signal in a single mode or (b) a distance between two optical waveguides while retaining all optical power of the optical signal in the single mode.

A high confinement optical waveguide means an optical waveguide having a second standardized refractive index greater than 0.75. The width of the first SP end 113$a$ is less than Lambda/Ncore. Lambda means a wavelength of the first optical signal 112. The width of the first HC end 116$a$ is greater than Lambda/Ncore. The second standardized refractive index=(Neff−Ncladding)/(Ncore2−Ncladding), wherein Ncore2 means an index of refraction of core material of a high confinement optical waveguide. A second tapered distance TD2 between (e.g., a side wall of) the low confinement optical waveguide 114 and a closest point on (e.g., a side wall of) the first high confinement optical waveguide 116 is adiabatically tapered, larger toward the second LC end 114$b$ so that a third distance D3 between (e.g., a sidewall of) the second LC end and a closest point on (e.g., a sidewall of) the first high confinement optical waveguide 116 is greater than the one wavelength of the first optical signal 112.

The second high confinement optical waveguide 118 includes a third HC end 118$a$, a second port (or fourth HC end) 118b opposite the third HC end 118a, and a fourth portion (FthP) 117 of HC optical waveguide comprising a first FthP end 117a, and a second FthP end 117b opposite the first FthP end 117a. The third portion 115 is substantially parallel to the fourth portion 117 so that an optical signal insertion loss between the third and the fourth portions is less than 0.1 decibels. A second width W2 of the second high confinement optical waveguide is adiabatically tapered wider from the first FthP end 117a through the second FthP end 117b. The width of the first TP end is less than Lambda/K*Ncore. The width of the second TP end is greater than Lambda/K*Ncore. K is a constant greater than one. A fourth distance D4 between (e.g., a sidewall of) the third HC end 118a and a closest point on (e.g., a sidewall of) the first high confinement optical waveguide 116 is greater than one wavelength of the first optical signal 112. A third tapered distance TD3 between (e.g., a side wall of) the second high confinement optical waveguide 118 and a closest point on (e.g., a side wall of) the first high confinement optical waveguide 116 is adiabatically tapered smaller away from the third HC end 118a so that a fifth distance D5 between (e.g., a sidewall of) the third portion 115 and (e.g., a sidewall of) the fourth portion 117 is less than the one wavelength of the first optical signal 112. A fourth tapered distance TD4 between (e.g., a side wall of) the first high confinement optical waveguide 116 and a closest point on (e.g., a side wall of) the second high confinement optical waveguide 118 is adiabatically tapered larger toward the second HC end so that a sixth distance D6 between (e.g., a sidewall of) the second HC end 116b and a closest point on (e.g., a sidewall of) the second high confinement optical waveguide 118 is greater than the one wavelength of the first optical signal 112. The second port is configured to respectively emit or receive the first optical signal 112 consisting of only respectively the fundamental transverse electrical mode or the fundamental transverse magnetic mode.

Figure 2:
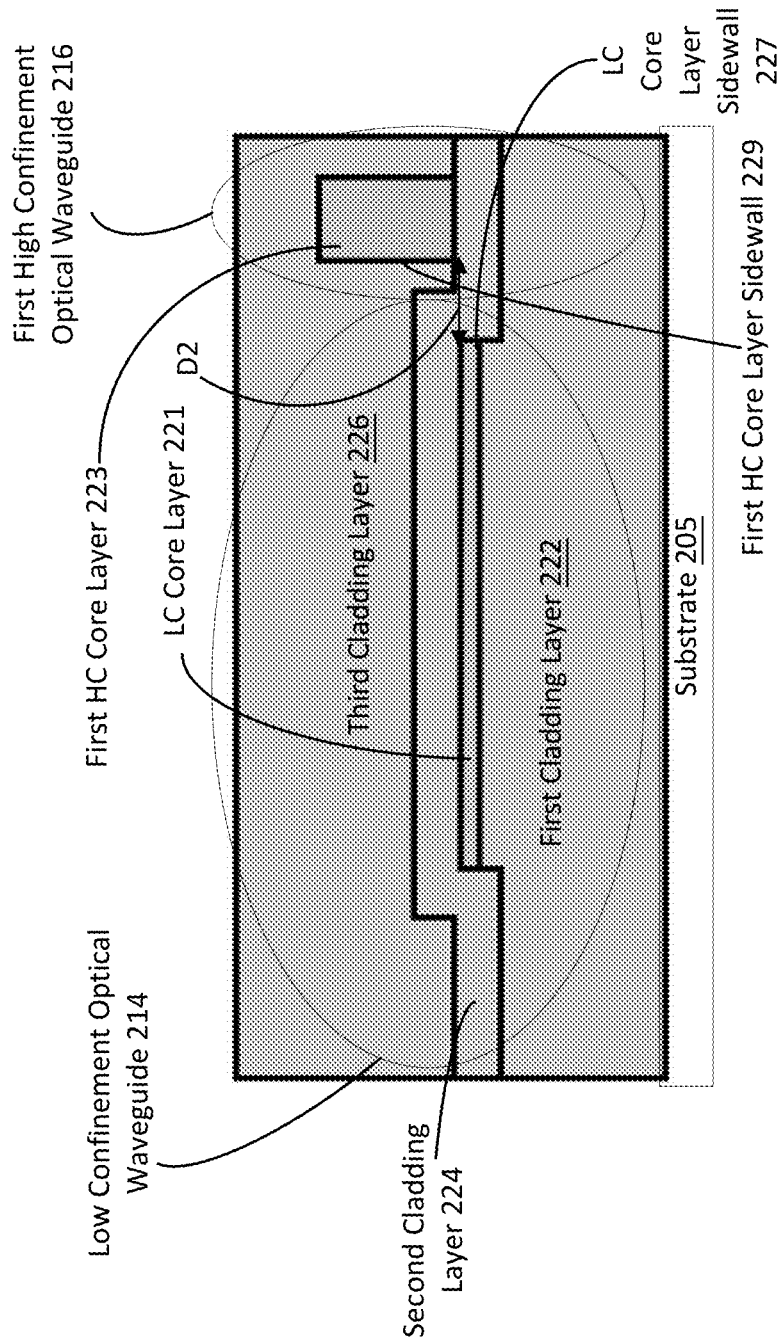
FIG. 2 illustrates a cross sectional view of one embodiment of the low confinement optical waveguide and the first high confinement optical waveguide along an axis AA-AA' illustrated in FIG. 1.

FIG. 2 illustrates a cross sectional view of one embodiment of the low confinement optical waveguide 214 and the first high confinement optical waveguide 216 along an axis AA-AA' illustrated in FIG. 1. The low confinement optical waveguide 214 comprises a LC core layer 221, a second cladding layer 224, and a third cladding layer 226. The LC core layer 221 is on the first cladding layer 222. The second cladding layer 224 is formed over the LC core layer 221 and exposed portions of the first cladding layer 222. The third cladding layer 226 is formed over, e.g., covers, the second cladding layer 224 and exposed portions of the second cladding layer 224. Optionally, the substrate 205 may be silicon, e.g., undoped silicon, or another electrical insulator. For pedagogical purposes, the second distance D2 (described elsewhere herein) is illustrated as a distance between, e.g., a sidewall 227 of, the LC core layer 221 and a closest point on a sidewall 229 of the first HC core layer 223.

The first high confinement optical waveguide 216 comprises a first HC core layer 223, the first cladding layer 222, the second cladding layer 224, and the third cladding layer 226. The first HC core layer 223 is on the second cladding layer 224. The third cladding layer 226 is formed over, e.g., covers, the first HC core layer 223. The second cladding layer 224 is formed over, e.g., covers, the first cladding layer 222. The first cladding layer 222 is formed on, e.g., over, the substrate 205.

Figure 3:
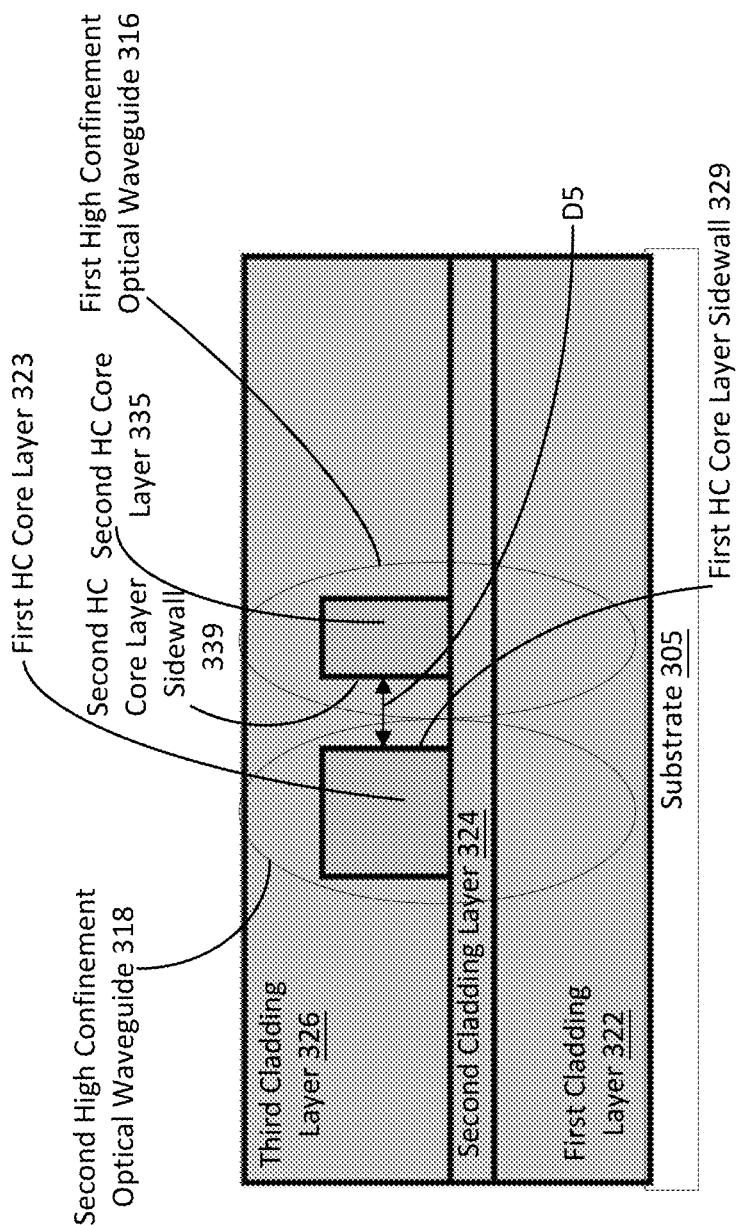
FIG. 3 illustrates a cross sectional view of one embodiment of the first high confinement optical waveguide and the second high confinement optical waveguide along an axis BB-BB' illustrated in FIG. 1.

FIG. 3 illustrates a cross sectional view of one embodiment of the first high confinement optical waveguide 316 and the second high confinement optical waveguide 318 along an axis BB-BB' illustrated in FIG. 1. The first high confinement optical waveguide 316 comprises the first HC core layer 323, the first cladding layer 322, the second cladding layer 324, and the third cladding layer 326. Each of the first HC core layer 323 and the second HC core layer 335 are formed over, e.g., cover, the second cladding layer 324. The third cladding layer 326 is formed over, e.g., covers, the first HC core layer 323 and exposed portions of the second cladding layer 324. The second cladding layer 324 is formed over, e.g., covers, the first cladding layer 322. The first cladding layer 322 is formed over, e.g., covers, the substrate 305. Optionally, the substrate 305 may be silicon, e.g., undoped silicon, or another electrical insulator. For pedagogical purposes, the fifth distance D5 (described elsewhere herein) is illustrated as a distance between, e.g., a sidewall 329 of, the first HC core layer 323 and a closest point on a sidewall 339 of the second HC core layer 335.

Optionally, each cladding layer includes silicon dioxide. Optionally, the first cladding layer 222 includes silicon dioxide which is thermally grown. Optionally, the second cladding layer 224 and the third cladding layer 226 are grown by plasma enhanced chemical vapor deposition. Optionally, each core layer includes silicon nitride. Optionally each core layer includes silicon nitride formed by plasma enhanced chemical vapor deposition.

Figure 4:
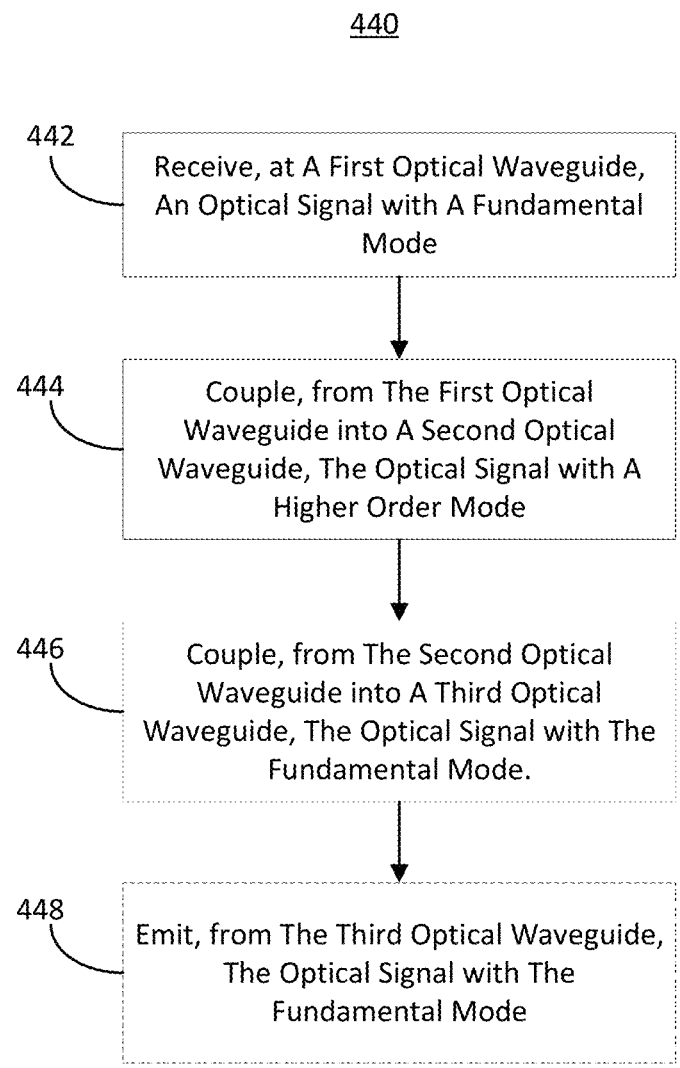
FIG. 4 illustrate one embodiment of a method of optically coupling an optical signal comprising a fundamental mode into and out of an optical coupler.

FIG. 4 illustrate one embodiment of a method 440 of optically coupling an optical signal comprising a fundamental mode into and out of an optical coupler. To the extent that the methods shown in any Figures are described herein as being implemented with any of the systems illustrated herein, it is to be understood that other embodiments can be implemented in other ways. Optionally, method 440 may be implemented by the optical coupler described with respect to FIGS. 1-3. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner). The definitions set forth herein for a high confinement optical waveguide and a low confinement optical waveguide are applicable to method 440.

In block 442, an optical signal including only a fundamental transverse electric mode or a fundamental transverse magnetic mode is received at, e.g., an optional first port of, a first optical waveguide. Optionally, the first optical waveguide is a low confinement optical waveguide, e.g., the low confinement optical waveguide 114 which has been described elsewhere herein; alternatively and optionally, the first optical waveguide is a high confinement optical waveguide, e.g., the second high confinement optical waveguide 118 described herein. Optionally, the optional first port may be the first LC end 114a and/or optical grating 105 if the first optical waveguide is the low confinement optical waveguide 114 or the fourth HC end 118b if the first optical waveguide is the second high confinement optical waveguide 118.

In block 444, the optical signal including only respectively a higher order transverse electric or a higher order transverse magnetic mode is optically coupled from the first optical waveguide into a second optical waveguide. The higher order mode means any mode other than the fundamental mode, i.e., the first order mode, the second order mode, the third order mode, or any other higher order mode. Optionally, the second optical waveguide is a high confinement optical waveguide, e.g., the first high confinement optical waveguide 116, which has been described elsewhere herein.

In block 446, the optical signal including only respectively the fundamental transverse electric mode or the fundamental transverse magnetic mode is coupled from the second optical waveguide into a third optical waveguide. Optionally, the third optical waveguide is a high confinement optical waveguide, e.g., the second high confinement optical waveguide 118 which has been described elsewhere herein; alternatively and optionally, the first optical waveguide is the low confinement optical waveguide, e.g., the low confinement optical waveguide 114.

In optional block 448, the optical signal including only respectively the fundamental transverse electric mode or the fundamental transverse magnetic mode is emitted from a second port of the third optical waveguide. Optionally, the optional first port may be the fourth HC end 118b if the third optical waveguide is the second high confinement optical waveguide 118 or the first LC end 114a and/or the optical grating 105 if the first optical waveguide is the low confinement optical waveguide 114.

Terms of relative position as used in this application are defined based on a plane parallel to, or in the case of the term coplanar—the same plane as, the conventional plane or working surface of a layer, wafer, or substrate, regardless of orientation. The term "horizontal" or "lateral" as used in this application are defined as a plane parallel to the conventional plane or working surface of a layer, wafer, or substrate, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of a layer, wafer, or substrate, regardless of orientation. The term "coplanar" as used in this application is defined as a plane in the same plane as the conventional plane or working surface of a layer, wafer, or substrate, regardless of orientation.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An optical coupler, comprising:
   a low confinement optical waveguide comprising a first low confinement end, a second low confinement end opposite the first low confinement end, and a first portion (FP) comprising a first FP end, a second FP end opposite the first FP end, and a first port, wherein at least one of the first FP end, the second FP end and the first port is at and extends from the first low confinement end, wherein the low confinement optical waveguide comprises a first core covered by cladding and has a first standardized refractive index less than 0.25, wherein the first port is configured to receive or emit a first optical signal consisting of a fundamental transverse electrical mode or a fundamental transverse magnetic mode, and wherein the first standardized refractive index=(Neff1−Ncladding)/(Ncore1−Ncladding), wherein Neff1 means an effective index of an optical signal fundamental mode in the low confinement optical waveguide, Ncladding means an index of refraction of the cladding, and Ncore1 means an index of refraction of the first core;
   a first high confinement optical waveguide comprising a first high confinement end, a second high confinement end opposite the first high confinement end, and a second portion (SP) and a third portion (TP), wherein the second portion comprises a first SP end, and a second SP end opposite the first SP end, wherein the third portion comprises a first TP end and a second TP end, wherein the first high confinement optical waveguide comprises a second core covered by the cladding and has a second standardized refractive index greater than 0.75, wherein a first distance between the first high confinement end and a point, closest to the first high confinement end, on the low confinement optical waveguide is greater than one wavelength of the first optical signal, wherein a first tapered distance between the low confinement optical waveguide and a closest point on the first high confinement optical waveguide is adiabatically tapered smaller away from the first high confinement end so that a second distance between the first portion and a closest point on the second portion is less than the one wavelength of the first optical signal, wherein the first portion of the low confinement optical waveguide is substantially parallel to the second portion of the first high confinement optical waveguide so that an optical signal insertion loss between the first and the second portions is less than 0.1 decibels, wherein a first width of the first high confinement optical waveguide is adiabatically tapered narrower from the first high confinement end through the first SP end, wherein a width of the first SP end is less than Lambda/Ncore2, where Lambda is a wavelength of the first optical signal, wherein a width of the second SP end is greater than Lambda/Ncore2, wherein the second standardized refractive index=(Neffh−Ncladding)/(Ncore2−Ncladding), wherein Neffh means an effective index of an optical signal fundamental mode in each of the first and a second high confinement optical waveguides, wherein Ncore2 means an index of refraction of the second core, and wherein a second tapered distance between the low confinement optical waveguide and a closest point on the first high confinement optical waveguide is adiabatically tapered larger toward the second low confinement end so that a third distance between the second low confinement end and a closest point on the first high confinement optical waveguide is greater than the one wavelength of the first optical signal;
   the second high confinement optical waveguide comprising a third high confinement end, a fourth high confinement end opposite the third high confinement end, and a fourth portion (FthP) comprising a first FthP end, and a second FthP end opposite the first FthP end, wherein the second high confinement optical waveguide comprises the second core covered by the cladding and has the second standardized refractive index greater than 0.75, wherein the fourth portion of the second high confinement optical waveguide is substantially parallel to the third portion of the first high confinement optical waveguide so that an optical signal insertion loss between the third and the fourth portions is less than 0.1 decibels, wherein a second width of the second high confinement optical waveguide is adiabatically tapered wider from the first FthP end through the second FthP end, wherein a fourth distance between the third high confinement end and a closest point on the first high confinement optical waveguide is greater than one wavelength of the first optical signal, wherein a third tapered distance between the second high confinement optical waveguide and a closest point on the first high confinement optical waveguide is adiabatically tapered smaller away from the third high confinement end so that a fifth distance between the third portion and the fourth portion is less than the one wavelength of the first optical signal, and wherein a fourth tapered distance between the first high confinement optical waveguide and the second high confinement optical waveguide is adiabatically tapered larger toward the second high confinement end so that a sixth distance between the second high confinement end and a closest point on the second high confinement optical waveguide is greater than the one wavelength of the first optical signal;

a substrate, wherein the low confinement optical waveguide, the first high confinement optical waveguide, and the second high confinement optical waveguide are over the substrate; and wherein the fourth high confinement end is configured to emit when the first port is configured to receive, or receive when the first port is configured to emit, the first optical signal;

wherein the low confinement optical waveguide, the first high confinement optical waveguide, and the second high confinement optical waveguide are planar optical waveguides.

2. The optical coupler of claim 1, wherein the substrate consists of electrically insulating material.

3. The optical coupler of claim 1, wherein the low confinement optical waveguide comprises the first core, comprising silicon nitride, and the cladding, the first high confinement optical waveguide comprises the second core, comprising the silicon nitride, and the cladding, and the second high confinement optical waveguide comprises the second core, comprising the silicon nitride, and the cladding, wherein the cladding comprises two cladding layers each of which comprises silicon dioxide.

4. The optical coupler of claim 1, wherein the first low confinement end is aligned with an edge of the substrate.

5. The optical coupler of claim 1, wherein the first port comprises a grating coupler extending from the first low confinement end and is configured to transform an axis of travel of the first optical signal.

6. An optical coupler, comprising:
a low confinement planar optical waveguide comprising a first portion and a first port, wherein the first port is configured to receive or emit a first optical signal consisting of a fundamental transverse electrical mode or a fundamental transverse magnetic mode, wherein the low confinement planar optical waveguide comprises a first core covered by cladding and has a first standardized refractive index less than 0.25, and wherein the first standardized refractive index=(Neff1−Ncladding)/(Ncore1−Ncladding), wherein Neff1 means an effective index of an optical signal fundamental mode in the low confinement optical waveguide, Ncladding means an index of refraction of the cladding, and Ncore1 means an index of refraction of the first core;

a first high confinement planar optical waveguide comprising a second portion, wherein the second portion and the first portion are configured to exchange a higher order mode optical signal consisting of a transverse electric mode when the first optical signal consists of the fundamental transverse electrical mode or a transverse magnetic mode when the first optical signal consists of the fundamental transverse magnetic mode, wherein higher order means an order greater than one, wherein the first high confinement planar optical waveguide comprises a second core covered by the cladding and has a second standardized refractive index greater than 0.75, and wherein the second standardized refractive index=(Neffh−Ncladding)/(Ncore2−Ncladding), wherein Neffh means an effective index of an optical signal fundamental mode in each of the first and a second high confinement planar optical waveguides, wherein Ncore2 means an index of refraction of the second core;

the second high confinement planar optical waveguide comprising a third portion and a second end, wherein the third portion and the second portion are configured to exchange an optical signal consisting of the fundamental transverse electrical mode or the fundamental transverse magnetic mode, wherein the second end is configured to emit or receive the first optical signal consisting of the fundamental transverse electrical mode when the first optical signal consists of the fundamental transverse electrical mode or the fundamental transverse magnetic mode when the first optical signal consists of the fundamental transverse magnetic mode, and wherein the second high confinement planar optical waveguide comprises the second core covered by the cladding and has the second standardized refractive index greater than 0.75; and a substrate, wherein the low, the first high, and the second high confinement planar optical waveguides are over the substrate;

wherein an insertion loss of the optical coupler is less than 0.2 decibels.

7. The optical coupler of claim 6, wherein the low confinement planar optical waveguide comprises a first low confinement end, a second low confinement end opposite the first low confinement end, and a first portion (FP) of the low confinement planar optical waveguide comprising a first FP end, a second FP end opposite the first FP end, and the first port, and wherein at least one of the first FP end, the second FP end and the first port is at and extends from the first low confinement end;

wherein the first high confinement planar optical waveguide comprises a first high confinement end, a second high confinement end opposite the first high confinement end, and the second portion (SP) and the third portion (TP), wherein the second portion comprises a first SP end, and a second SP end opposite the first SP end, wherein the third portion comprises a first TP end and a second TP end, wherein a first distance between the first high confinement end and a point, closest to the first high confinement end, on the low confinement planar optical waveguide is greater than one wavelength of the first optical signal, wherein a first tapered distance between the low confinement planar optical waveguide and a closest point on the first high confinement planar optical waveguide is adiabatically tapered smaller away from the first high confinement end so that a second distance between the first portion and a closest point on the second portion is less than the one wavelength of the first optical signal, wherein the first portion is substantially parallel to the second portion so that an optical signal insertion loss between the first and the second portions is less than 0.1 decibels, wherein a first width of the first high confinement planar optical waveguide is adiabatically tapered narrower from the first high confinement end through the first SP end, wherein a width of the first SP end is less than Lambda/Ncore2, where Lambda is a wavelength of the first optical signal, wherein a width of the second SP end is greater than Lambda/Ncore2, and wherein a second tapered distance between the low confinement planar optical waveguide and a closest point on the first high confinement planar optical waveguide is adiabatically tapered larger toward the second low confinement end so that a third distance between the second low confinement end and a closest point on the first high confinement planar optical waveguide is greater than the one wavelength of the first optical signal; and wherein the second high confinement planar optical waveguide comprises a third high confinement end, a fourth high confinement end opposite the third high confinement end, and a fourth portion (FthP) comprising a first FthP end, and a second FthP end opposite the first FthP end, wherein the fourth portion is substantially parallel to the third portion so that an optical signal insertion loss between the third and the fourth portions is less than 0.1 decibels, wherein a second width of the second high confinement planar optical waveguide is adiabatically tapered wider from the first FthP end through the second FthP end, wherein a fourth distance between the third high confinement end and a closest point on the first high confinement planar optical waveguide is greater than one wavelength of the first optical signal, wherein a third tapered distance between the second high confinement planar optical waveguide and a closest point on the first high confinement planar optical waveguide is adiabatically tapered smaller away from the third high confinement end so that a fifth distance between the third portion and the fourth portion is less than the one wavelength of the first optical signal, and wherein a fourth tapered distance between the first high confinement planar optical waveguide and the second high confinement planar optical waveguide is adiabatically tapered larger toward the second high confinement end so that a sixth distance between the second high confinement end and a closest point on the second high confinement planar optical waveguide is greater than the one wavelength of the first optical signal;

wherein the second end comprises the fourth confinement end.

8. The optical coupler of claim 7, wherein the low confinement planar optical waveguide comprises the first core comprising silicon nitride and the cladding, the first high confinement planar optical waveguide comprises the second core comprising the silicon nitride and the cladding, and the second high confinement planar optical waveguide comprises the second core comprising the silicon nitride and the cladding, wherein the cladding comprises two cladding layers each of which comprises silicon dioxide.

9. The optical coupler of claim 7, wherein the first low confinement end is aligned with an edge of the substrate.

10. The optical coupler of claim 7, wherein the first port comprises a grating coupler extending from the first low confinement end and is configured to transform an axis of travel of the first optical signal.

11. The optical coupler of claim 6, wherein the substrate consists of electrically insulating material.

12. A method of optically coupling an optical energy consisting of a fundamental transverse electric mode or a fundamental transverse magnetic mode into and out of a high confinement optical waveguide, the method comprising:

receiving a first optical signal consisting of the fundamental transverse electric mode or the fundamental transverse magnetic mode at a first port of a first planar optical waveguide;

optically coupling a first optical signal consisting of a higher order transverse electric mode when the first optical signal consists of the fundamental transverse electric mode, or a higher order transverse magnetic mode when the first optical signal consists of the fundamental transverse magnetic mode, from the first planar optical waveguide into a second planar optical waveguide; and optically coupling the first optical signal consisting of the fundamental transverse electric mode when a received first optical signal consists of the fundamental transverse electric mode, or the fundamental transverse magnetic mode when the received first optical signal consists of the fundamental transverse electric mode, from the second planar optical waveguide into a third planar optical waveguide;

wherein the second planar optical waveguide comprises a first high confinement planar waveguide;

wherein the first planar optical waveguide comprises a low confinement planar waveguide or a second high confinement planar waveguide;

wherein the third planar optical waveguide comprises the second high confinement planar waveguide when the first planar optical waveguide comprises the low confinement planar optical waveguide or the low confinement planar waveguide when the first planar optical waveguide comprises the high confinement optical waveguide;

wherein low confinement planar optical waveguide comprises a first core covered by cladding and has a first standardized refractive index less than 0.25, and wherein the first standardized refractive index=(Neff1−Ncladding)/(Ncore1−Ncladding), wherein Neff1 means an effective index of an optical signal fundamental mode in the low confinement planar waveguide, Ncladding means an index of refraction of the cladding, and Ncore1 means an index of refraction of the first core;

wherein the first and the second high confinement planar waveguides comprises a second core covered by the cladding and has a second standardized refractive index greater than 0.75, wherein the second standardized refractive index=(Neffh−Ncladding)/(Ncore2−Ncladding), wherein Neffh means an effective index of an optical signal fundamental mode in each of the first and the second high confinement optical waveguides, wherein Ncore2 means an index of refraction of the second core.

13. The method of claim 12, further comprising emitting, from a second port of the third planar optical waveguide, the first optical signal consisting of the fundamental transverse electric mode when the received first optical signal consists of the fundamental transverse electric mode or the fundamental transverse magnetic mode when the received first optical signal consists of the fundamental transverse magnetic mode.

14. The method of claim 12, further comprising transforming, with the first port, an axis of travel of the first optical signal, wherein the first planar optical waveguide comprises the low confinement planar waveguide; and wherein the third planar optical waveguide comprises the second high confinement planar waveguide.

* * * * *